US011170007B2

(12) United States Patent
Freed et al.

(10) Patent No.: US 11,170,007 B2
(45) Date of Patent: Nov. 9, 2021

(54) HEADSTART FOR DATA SCIENTISTS

(71) Applicant: International Business Machines Corporation, Armonk, NY (US)

(72) Inventors: Andrew R. Freed, Cary, NC (US); Tristan A. TeNyenhuis, West Islip, NY (US); Keith D. Cramer, Pine Island, MN (US); Sorabh Murgai, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 16/381,725

(22) Filed: Apr. 11, 2019

(65) Prior Publication Data

US 2020/0327134 A1 Oct. 15, 2020

(51) Int. Cl.
| | |
|---|---|
| *G06F 16/2457* | (2019.01) |
| *G06F 16/242* | (2019.01) |
| *G06F 16/28* | (2019.01) |
| *G06F 16/22* | (2019.01) |
| *G06F 40/205* | (2020.01) |

(52) U.S. Cl.
CPC ........ *G06F 16/24578* (2019.01); *G06F 16/22* (2019.01); *G06F 16/243* (2019.01); *G06F 16/288* (2019.01); *G06F 40/205* (2020.01)

(58) Field of Classification Search
CPC .................................................. G06F 16/24578
See application file for complete search history.

(56) References Cited

U.S. PATENT DOCUMENTS

| | | | |
|---|---|---|---|
| 8,255,412 | B2 | 8/2012 | Gao et al. |
| 8,489,590 | B2 | 7/2013 | Chang et al. |
| 2006/0224579 | A1 | 10/2006 | Zheng |
| 2006/0287980 | A1 | 12/2006 | Liu et al. |
| 2009/0182723 | A1 | 7/2009 | Shnitko et al. |
| 2009/0276414 | A1 | 11/2009 | Gao et al. |
| 2010/0063948 | A1 | 3/2010 | Virkar et al. |
| 2010/0153315 | A1 | 6/2010 | Gao et al. |
| 2010/0185623 | A1 | 7/2010 | Lu et al. |
| 2012/0109860 | A1 | 5/2012 | Xu et al. |
| 2012/0150855 | A1 | 6/2012 | Chang et al. |

(Continued)

OTHER PUBLICATIONS

Wei Gao et al., "Learning to rank only using training data from related domain," SIGIR '10 Proceedings of the 33rd international ACM SIGIR conference on Research and development in information retrieval, pp. 162-169.

(Continued)

*Primary Examiner* — Hau H Hoang
(74) *Attorney, Agent, or Firm* — Terrile, Cannatti & Chambers, LLP; Michael Rocco Cannatti (57) ABSTRACT

A method, system, and apparatus are provided for recommending machine learning (ML) project resources for completing a user project by generating indexed project metadata for a plurality of ML projects, generating search metadata for a search request for ML project resources to develop an ML project, and then evaluating the search metadata against the indexed project metadata for each ML project to form a relevancy assessment which is used to order trained models from the ML projects and to display one or more recommended ML project resources comprising one or more of the plurality of trained models having a relevancy assessment exceeding a relevancy threshold.

20 Claims, 5 Drawing Sheets

(56) References Cited

U.S. PATENT DOCUMENTS

2015/0293976 A1  10/2015  Guo et al.

OTHER PUBLICATIONS

Yi Bin et al., "Training data selection for cross-project defection prediction: which approach is better?" ESEM '17 Proceedings of the 11th ACM/IEEE International Symposium on Empirical Software Engineering and Measurement, Abstract, 2017.

Joseph Kozhaya et al., U.S. Appl. No. 16/018,284, filed Jun. 26, 2018, entitled "Cloud Sharing and Selection of Machine Learning Models for Service Use".

HEADSTART FOR DATA SCIENTISTS

BACKGROUND OF THE INVENTION

In the field of artificially intelligent computer systems, cognitive computing systems (such as the IBM Watson™ artificially intelligent computer system or and other natural language question answering systems) simulate human thought processes by using computerized models and self-learning systems, such as data mining, pattern recognition and natural language processing to mimic the way the human brain functions. Increasingly, cognitive services (e.g., visual recognition, conversation, speech to text, language translation, etc.) are provided which package cognitive computing machine learning algorithms into discrete components that are easy for users to interface with their applications. Today's cognitive services are bundled with default machine learning models that have been trained on a set of representative training data (referred to as ground truth), which typically covers a wide range of topics. For a user's application to gain full benefit of a cognitive service, the user should train the cognitive service's machine learning model to learn the specifics of the problem from sample labeled data and help make predictions on unlabeled data by using a "training process" which involves providing the machine learning model with a representative data set of inputs and corresponding outputs. For example, if user's application pertains to a specific topic (e.g., financial, travel, healthcare, etc.), the user should train the machine learning model with question/answer pairs relevant to the specific industry so that the cognitive service learns by example from pairs of representative inputs/outputs which constitute the "ground truth" for the system, thereby improving the accuracy of the corresponding cognitive service.

In recent years, the number of machine learning models and associated datasets has grown exponentially, but this proliferation of data has the unfortunate side effect of making it increasingly difficult to find the data, models, and techniques that are relevant for building successful data science projects. For example, in a large machine learning development environment, like Watson Studio, there may be thousands of such projects and data sets available, but there is no efficient and accurate way to determine if someone is already working in the same or similar domain, or if there are any existing machine learning models or ground truth or techniques that might expedite development of a user's project. Conventional solutions for using a basic keyword search of existing models or data sets is not sufficient to find deeply relevant models and data sets that can help the user with the data science work. As a result, the existing solutions for finding data science models or assets solutions that are relevant to a user's project are extremely difficult at a practical level since there is no tool that is able to find relevant resources for a project taking into account the particulars of a given problem statement and data set.

SUMMARY

Broadly speaking, selected embodiments of the present disclosure provide an information handling system, method, and apparatus for identifying machine learning project resources that are relevant to a user's modeling problem by performing multiple tests using a cognitive service on multiple trained machine learning models and datasets to find matching machine learning project resources and recommendations based on user data and/or search query information. For each of a plurality of catalogued machine learning models and datasets, an analysis, such as natural language processing and analytical analysis, is performed on the catalogued machine learning models and datasets to assemble indexed metadata for identifying one or more elements used to build the machine learning models and datasets. In addition, a search query is constructed based on user-specified query parameters, received sample data from the user, and/or extracted search metadata. The information handling system performs a search of the indexed metadata using the search query to find matching machine learning project resources based on metadata commonalities. In selected embodiments, the matching project resources may be ranked or ordered for relevancy to the user's needs, such as by using machine learning algorithms to assess entity matching in the domain(s) of interest. In addition, the information handling system presents the matching machine learning project resources as search results to the user, alone or in combination with insights or recommendations that are based on identified differences between user content and each returned result. Example recommendations may include an entity expansion suggestion (e.g., for models with similar domains, the recommendation may suggest expanding with other entities seen in those models) and/or a dataset tuning suggestion (e.g., recommending dataset adjustments based on models with similar dataset features).

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
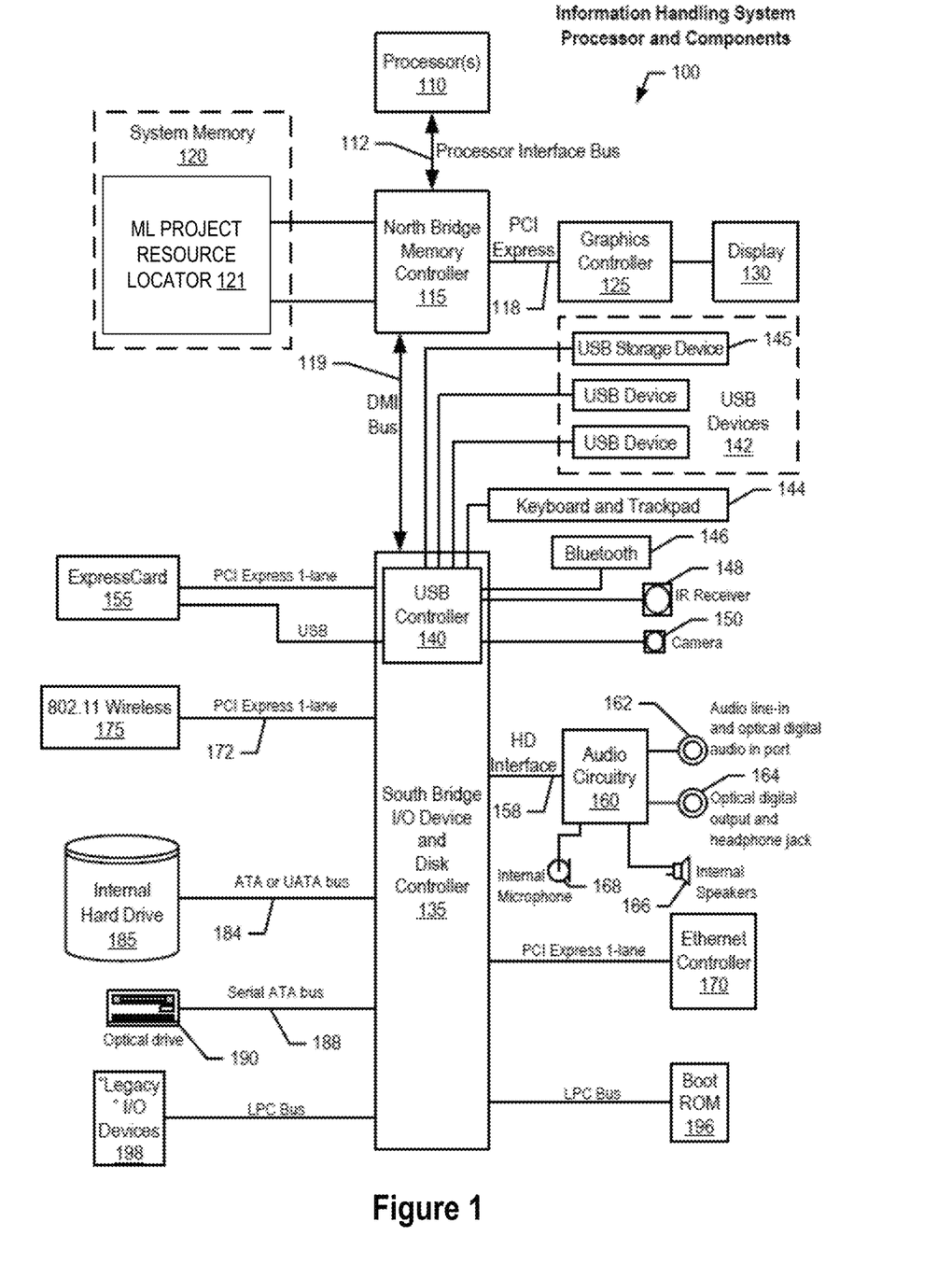
FIG. 1 depicts a block diagram of an information handling system having a machine learning project resource locator in accordance with selected embodiments of the present disclosure.

FIG. 1 illustrates information handling system 100, more particularly, a processor and common components, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. In the system memory 120, a variety of programs may be stored in one or more memory devices, including a machine learning project resource locator module 221 which may be invoked to analyze a user problem statement and dataset to find ML project resources, such as data science models/assets, that can provide a head start for a user solution. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy"I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory. In addition, an information handling system need not necessarily embody the north bridge/south bridge controller architecture, as it will be appreciated that other architectures may also be employed.

Figure 2:
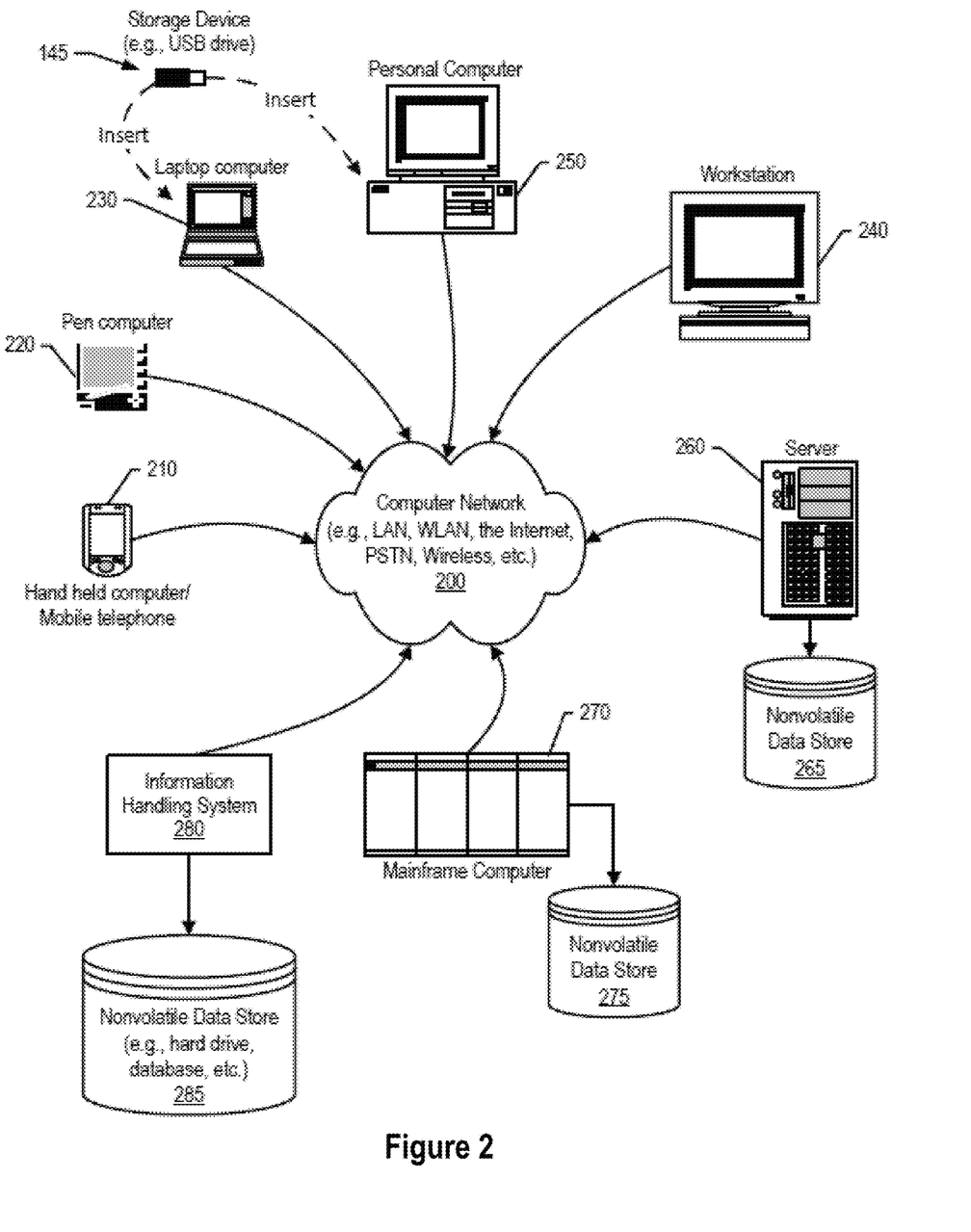
FIG. 2 depicts a network environment in which an information handling system uses a machine learning project resource locator in accordance with selected embodiments of the present disclosure.

FIG. 2 depicts a network environment 200 in which an information handling system uses a machine learning project resource locator in accordance with selected embodiments of the present disclosure. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop or notebook computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, there are an abundance of cognitive services bundled or bound to machine learning models that have been trained and proven on a set of ground truth (e.g., question/answer pairs) that is specific to a topic or category or that are trained on broad categories of information. The ability to use keyword searches to evaluate a database or catalog of ML models and datasets to find ML project resources that are relevant to a new project is not effective or efficient, especially with large machine learning development environments where there may be thousands of such projects and data sets available. To facilitate the ability of a user to effectively locate ML project resources for use in building machine learning models, there is disclosed herein an approach that can be executed on an information handling system that allows users to provide sample data and/or search queries to a ML project analysis system which identifies and returns the best matching machine learning models and datasets, alone or in combination with suggestions about how the matching resources can help with modeling a current data set. In one embodiment, the ML project analysis system applies natural language processing (NLP) and analytic analysis to catalogued ML models and training data to categorize the models into aspects including domain, entities, and relationships between the entities. Responsive to receiving a request from a user to assist with developing an ML project, the ML project analysis system analyzes the request to determine keywords, intents, and a domain, and then associates the keywords, the intents, and the domain with indexed metadata from the categorized models/datasets to form a relevancy assessment which is used to order the categorized models for presentation to the user. In selected embodiments, the relevancy assessment uses ML algorithms to entity matching between the user's search request and the catalogued ML models and in one or more domains of interest.

The ML project analysis system may also provide a user interface (UI) representation of the search results with matching categorized models, associated relevancy assessment, and keyword mapping which allows the user to adjust prioritization based on entries in the representation. Responsive to user selection/adjustment, the ML project analysis system may update the presentation of matching ML project resources to better fit the user needs. In one embodiment, the ML project analysis system leverages cloud and machine learning model containers in hosting an exchange of a variety of machine learning models and datasets and instrumenting a solution that identifies the best-suited machine learning models and datasets to each user data set or search query based on an evaluation the ML project analysis system runs against that sample data.

Figure 3:
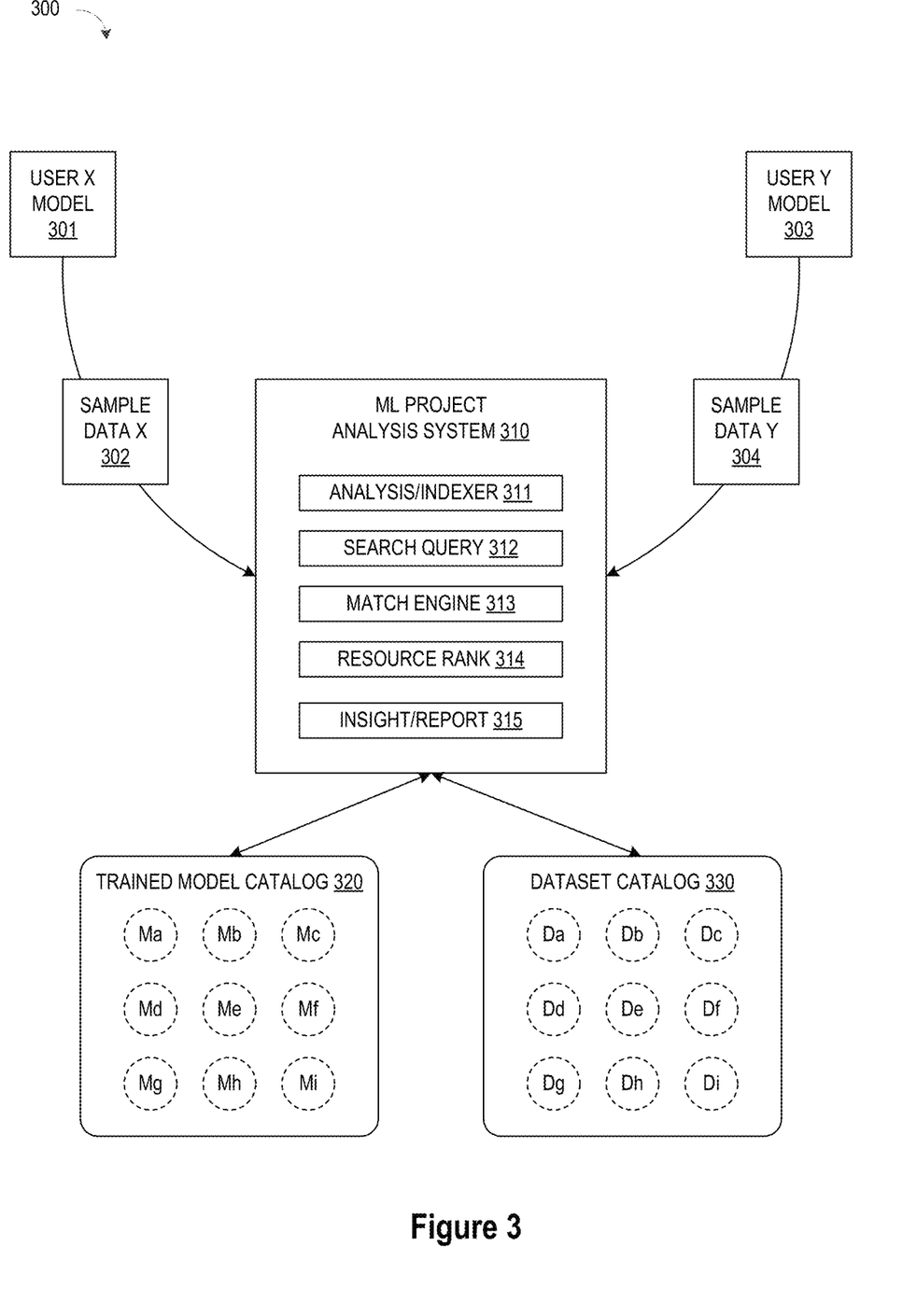
FIG. 3 diagrammatically depicts a machine learning development environment which uses a machine learning project resource deployment system for analyzing user data to identify a best-suited, already trained, machine learning model and dataset in accordance with selected embodiments of the present disclosure.

To provide additional details for an improved understanding of selected embodiments of the present disclosure, reference is now made to FIG. 3 which is a diagrammatical depiction of a machine learning development environmet 300 which uses a machine learning (ML) project analysis system 310 for analyzing user data to identify a best-suited, already trained, machine learning model and dataset. The machine learning development environmet 300 uses the ML project analysis system 310 in combination with machine learning models in trained model catalog 320 and the associated training datasets in the dataset catalog 330 to analyze user data and search queries, and to identify matching trained machine learning models and datasets that are relevant to a user's model 301, 303. The ML project analysis system 310 includes an analysis and index module/service 311, a search query module/service 312, a matching engine module/service 313, a resource ranking module/service 314, and an insight/reporting module/service 315. As will be appreciated, the ML project analysis system 310 may include more, less, and/or different services that what is shown in FIG. 3 and described herein.

As disclosed, the trained model catalog 320 as includes a repository of machine learning models Ma-Mi that are trained, respectively, on the datasets Da-Di in the dataset catalog 330. In addition, default machine learning models may be included in trained model catalog 320 as optional machine learning model based on the user's sample data. To assemble the catalogues 320, 330, expert providers may train machine learning models (e.g., Ma) on specific data (e.g., Da), and offer the trained machine learning model for a fee. As expert providers develop and train new trained models with training datasets, they are stored, respectively, in the trained model catalog 320 and dataset catalog 330 for subsequent use by various users. Expert providers may, in turn, may receive compensation when their particular models are utilized by other users. In one embodiment, expert providers begin with a default machine learning model as a baseline and then enhance the default machine learning model by training them using specific topic training data.

Once the trained model catalog 320 and dataset catalog 330 are assembled, the analysis and index module/service 311 in the ML project analysis system 310 analyzes and indexes the catalogued datasets, models and relevant data to generate indexed ML project metadata. For example, the analysis/index module/service 311 may apply natural language processing and analytic analysis to the catalogued models Ma-Mi to identify model metadata (e.g., model type, author(s), training data size, training steps, performance metrics, etc.). In addition, the analysis/index module/service 311 may apply natural language processing and analytic analysis to the catalogued datasets Da-Di to identify which domains, entities and/or data types are included in the datasets.

In beginning work on the user X model 301, user X begins by providing sample data X 302 to the ML project analysis system 310 that is representative of the type of data used by user X model 301. For example, sample data X 302 may include text beginning with who/what/when/where/why/how which the search query module/service 312 in the ML project analysis system 310 evaluates along with user-defined or inferred query parameters to build a search query from specified domain, entities, model type, keywords, etc. relating to the user X model 301.

The ML project analysis system 310 evaluates the sample data X 302 against the catalogued models and datasets 320, 330 with the matching engine module/service 313 to determine which categorized models 320 and datasets 330 are most relevant to the user X model 301. For example, the matching engine module/service 313 may apply natural language processing and analysis to compare the indexed ML project metadata to the source project's extracted search metadata.

When matching analysis completes, the ML project analysis system 310 ranks the matching ML models and datasets using the resource ranking module/service 314 based on the relevancy of the indexed ML project metadata to the user search data 301. For example, the resource ranking module/service 314 may apply user-specified preferences to tune the weight of commonality matches to account for the preferences. For example, if User X 301 is looking for a Watson Assistant project with similar intents, the resource ranking module/service 314 may be configured to weigh the matches of intents higher than similarly common utterances, dialog nodes, logs or domains. Or if the User X 301 is interested in Visual Recognition projects near a certain location in the user's domain, the resource ranking module/service 314 may be configured to weigh those metadata metrics higher over the accuracy, size, resolution, or classification of an image set.

Once the most relevant ML project resources are identified, the ML project analysis system 310 returns the most relevant project matches to the search user using the insight/reporting module/service 315 along with an assigned relevancy score for each resource so that the user can explore each returned project in depth. To this end, the insight/reporting module/service 315 may be configured to determine a difference metric between the user's content and each returned result. Using the difference metric values, the insight/reporting module/service 315 makes recommendations which are scaled based on user query preferences and/or generates insights about the user model X.

Likewise, user Y system 303 provides sample data Y 304 to the ML project analysis system 310 and requests ML project resources. The ML project analysis system 310 evaluates sample data Y 304 against the trained model catalog 320 and the associated training datasets in the dataset catalog 330 using a set of the cognitive services 311-315 to analyze user data and search queries, and to identify matching trained machine learning models and datasets that are relevant to a user's model 303. When testing completes, the ML project analysis system 310 ranks the ML project resources and dynamically links them to the user Y model 303.

Figure 4:
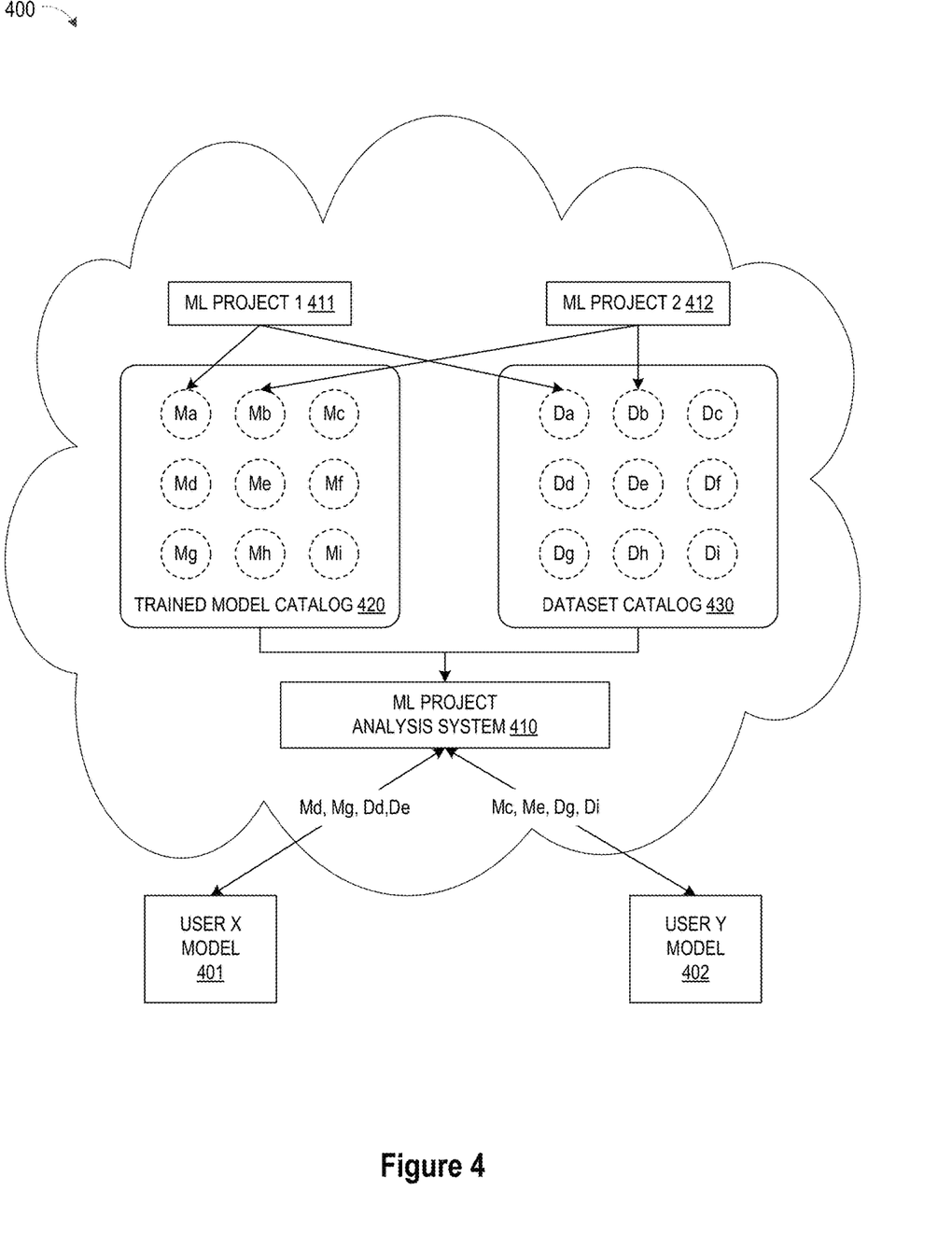
FIG. 4 diagrammatically depicts user models interfacing with catalogued machine learning models and datasets based on metadata commonalities in accordance with selected embodiments of the present disclosure.

To provide additional details for an improved understanding of selected embodiments of the present disclosure, reference is now made to FIG. 4 which is a diagrammatical depiction of a cloud-based system 400 for sharing and selecting catalogued ML project resources 420, 430 with one or more user models 401, 402 using a ML project analysis system 410 by analyzing metadata commonalities between the user data and catalogued models/datasets. As shown in FIG. 4, the ML project analysis system 410 enhances both the user X model 401 and the user Y model 402 by dynamically identifying different machine learning models from trained model catalog 420 and different datasets from dataset catalog 430 based on analysis of the user's sample data and/or submitted search requests. For each ML project 411, 412 (e.g., Project 1), the corresponding trained model (e.g., Ma) may be trained on an associated dataset (e.g., Da) and then stored in the catalogs 420, 430 for subsequent reuse without requiring retraining, thus eliminating time and costs to retrain or reconstruct machine learning models. However, based on prior analysis of sample data from the user model and indexed metadata from the catalogued ML project resources 420, 430, the user models 401, 402 interfacing with the ML project analysis system 410 may be dynamically linked to best-fitting models and datasets which need not necessarily be part of the same ML project.

To this end, the ML project analysis system 410 may evaluate sample data and/or search query information from the User X model 401 against each of the models Ma-Mi and datasets Da-Di in the catalogs 420, 430 to identify matching trained models Md, Mg and datasets Dd, De as being the most relevant matches for the User X model 401. In the depicted cloud-based 400, the ML project analysis system 410 is deployed on cloud 440 with trained model catalog 420 and dataset catalog 430, and applies one or more cognitive and/or NLP services, such as a question and answer service, natural language classifier service, to identify matching trained models Md, Mg and datasets Dd, De which are ranked for relevancy to the user X model 401. Cloud 400 may be a public cloud, a private cloud, a hybrid cloud, or any other type of accessible computer network.

Likewise, ML project analysis system 410 may evaluate sample data and/or search query information from the User Y model 402 against each of the models Ma-Mi and datasets Da-Di in the catalogs 420, 430 to identify matching trained models Mc, Me and datasets Dg, Di as being the most relevant matches for the User X model 402. As a result, the ML project analysis system 410 applies one or more cognitive and/or NLP services to identify matching trained models Mc, Me and datasets Dg, Di which are ranked for relevancy to the user Y model 402.

Figure 5:
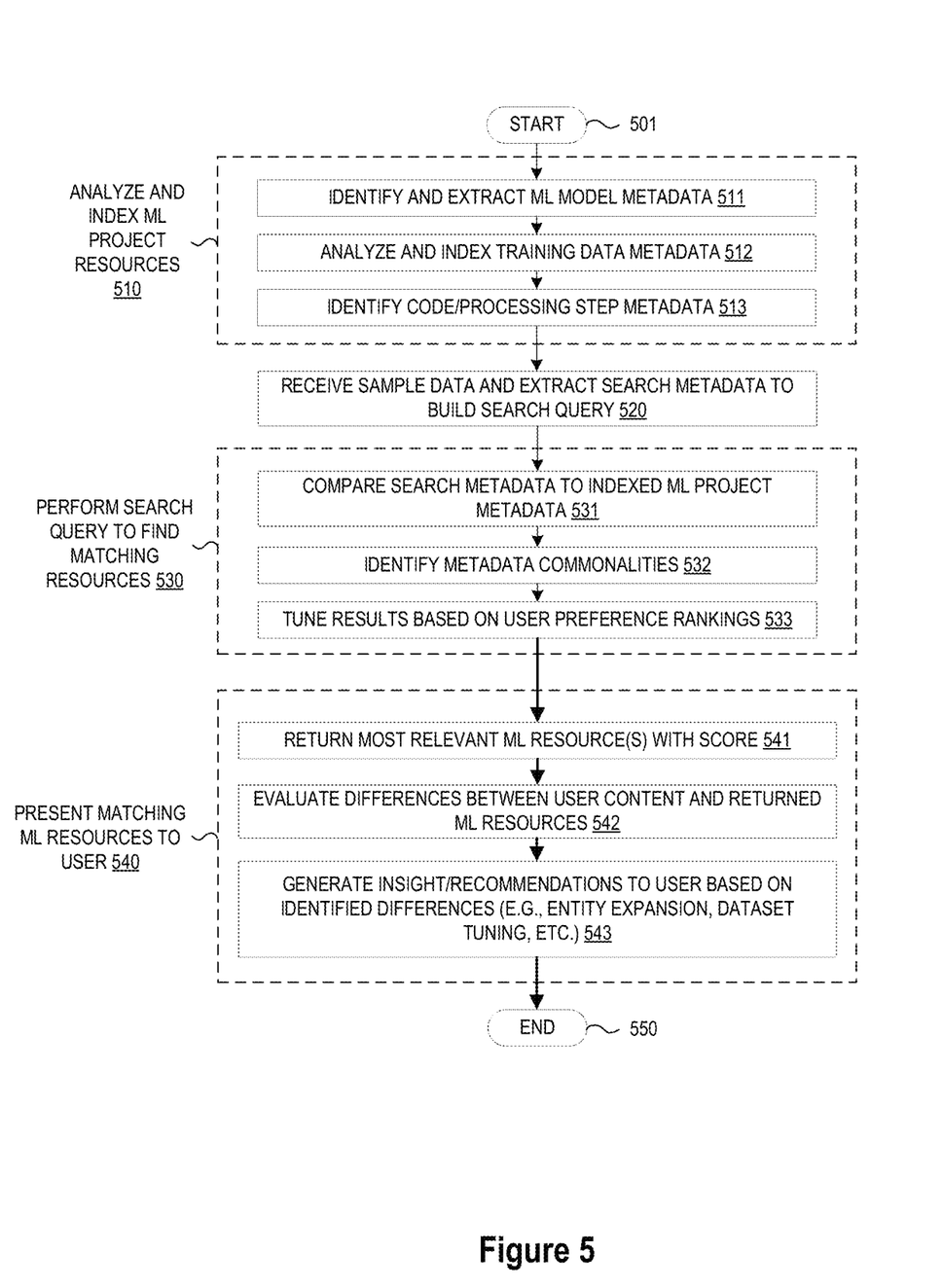
FIG. 5 depicts a simplified flow chart showing the logic for matching machine learning resources with user search queries in accordance selected embodiments of the present disclosure.

To provide additional details for an improved understanding of selected embodiments of the present disclosure, reference is now made to FIG. 5 which depicts a simplified flow chart 500 showing the logic for matching machine learning resources with user search queries. The processing shown in FIG. 5 may be performed in whole or in part by a cognitive system, such as the information handing system 100 or other natural language question answering system, which uses natural language classifier services, NLP services and related analytics analysis to generate indexed ML project resource metatdata 510, to perform search query analytics 520, to perform search queries to find matching resources 530, and to present matching ML resources to the user 540 in response to the user search query.

In the depicted process flow 500, processing commences at 501 which may occur during design and/or test time when developers assemble a plurality of ML projects having multiple ML models and datasets for storage in a machine learning development environment, such as the Watson Studio system. At this point, the method steps 510, 520, 530, 540 embody the functionality of a design tool that evaluates user-defined query parameters (e.g., domain, model type, example entities, etc.) and/or inferred parameters from sample data of the user) against submitted ML models and databases from a database to identify matching ML project resources that are relevant to the user. As explained below, the design tool effectively searches the model/dataset database for elements used in building machine learning models that are relevant to the designer's project needs using one or more search and analysis methods described as follows.

Using the assembled ML projects, the existing pertinent data sets, models and relevant data are analyzed and indexed at step 510 to generate indexed ML project metadata. The generation of indexed metadata at step 510 may be performed at the information handling system 100 or ML project analysis system 310 by applying NLP processing, extraction algorithms, and/or machine learning techniques to the catalogued ML models and datasets from the assembled ML projects. As will be appreciated, one or more processing steps may be employed to generated indexed ML project metadata.

For example, the analysis and index processing at step 511 may employ NLP processing and classifier services to identify, for each trained ML model, model metadata, such as model type, author(s), training data size, training steps, performance metrics, algorithm type, and the like. In addition or in the alternative, the analysis and index processing at step 512 may analyze and index identify, for each trained training dataset, training metadata, such as domains and/or entities included in the dataset, data types, and the like. In addition or in the alternative, the analysis and index processing at step 513 may identify code and/or processing metadata used by the ML model and/or metadata, such as, for example, processing steps to convert images to pixels, to convert all inputs to lower case, to reduce the image size, to convert to gray scale, or the like. As disclosed herein, the processing at steps 511-513 may be performed at the information handling system 100 or ML project analysis system 310 by employing one or more NLP, extraction, and/or machine learning algorithms to search for elements used in building ML models and to generate ML project metadata. Examples of data and metadata that can be indexed for an ML based project, such as Watson Assistant, include utterances, entities, intents, dialog nodes, logs, domains found in the utterances/responses, and the like. Similarly, for a Visual Recognition project, example metadata for indexing would include image sample sets and properties (size, resolution, location data, classification), entities/domains in the image, and the like. In addition, a Watson Studio project could be analyzed to index project metadata, such as entities/domain in training columns, extracted features, model algorithms, and the like.

Once indexing of the ML project models and datasets is complete, a search query may be built at step 520 based on search data or parameters provided by the user. As disclosed herein, the search query may be built at the information handling system 100 or ML project analysis system 310 by employing one or more NLP, extraction, and/or machine learning algorithms which are applied to the sample data received from a user to extract search metadata. Examples of search metadata that can be extracted from the sample data include user-defined query parameters, such as domain, model type, example entities, and the like. In addition or in the alternative, the processing at step 520 may be applied to infer parameters by analyzing the sample data to extract domain, entities, keywords, and the like. In addition or in the alternative, the processing at step 520 may allow the user to provide parameters for use in ranking or scoring the search results as part of the search query. Though selected embodiments of the present disclosure may use a user search query for related models at step 520 to trigger the subsequent project resource recommendation steps 530-540, it will be appreciated that the ML project resource search functionality may be triggered to other activities. For example, the project resource search functionality may be triggered by an upload action from the user (e.g., a git commit hook or Watson Studio action) for certain data types (csv, etc) which prompts the system to proactively make recommendations as described hereinbelow.

Once the search query is built, the search query is performed at processing step 530 to find the matching ML project resources. As disclosed herein, the search query processing at step 530 may be performed at the information handling system 100 or ML project analysis system 310 to find ML projects from the database that are similar to the catalogued models and datasets based on the indexed ML project metadata. As will be appreciated, one or more processing steps may be employed to perform the search query.

For example, the search query processing at step 531 may employ NLP processing and classifier services to compare indexed metadata for each trained ML project with search metadata. In addition or in the alternative, the search query processing at step 532 may analyze and identify metadata commonalities between the search metadata and project metadata. Examples of using metadata commonalities to determine the best matches for an ML based project, such as Watson Assistant, include identifying commonalities between utterances, entities, intents, dialog nodes, and the domains/entities in the search query. Similarly, for a Visual Recognition project, example search techniques would include identifying commonalities between domain/entities in training data sets and the domain/entities in the query. In addition, a Watson Studio project could be analyzed to find commonalities between entities/domain in training columns and the domain/entities in the query, as well as models of the query-specified type. In addition or in the alternative, the search query processing at step 533 may tune the results based on user-specified preference rankings. Examples of tuning the weight of commonality matches to account for user preferences for an ML based project, such as Watson Assistant with similar intents, might include weighing the matches of intents higher than similarly common utterances, dialog nodes, logs or domains. Alternatively, if the user preference is to enhance the extracted features for a machine learning model, such as one built in Watson Studio, the tuning might find Watson Knowledge Studio entity data of the same domain valuable as augmented features (WKS Bigrams or entity Co-location data). As disclosed herein, the processing at steps 531-533 may be performed at the information handling system 100 or ML project analysis system 310 by employing one or more NLP, extraction, and/or machine learning algorithms to find project resources that match the search query.

Once search results are returned, the matching ML resources are presented to the user at processing step 540 to assist the user with expediting construction of a data science project. As disclosed herein, the presentation of matching resources at step 540 may be performed at the information handling system 100 or ML project analysis system 310 to identify ML project resources which are in the same or similar domain, which use machine learning models or ground truth that would expedite development, which use techniques that could apply to the user's project, or otherwise would help bootstrap the user's project. As will be appreciated, one or more processing steps may be employed to perform the search query.

An example of a resource presentation processing step 540 is to employ NLP and interface display processing at step 541 to return the most relevant ML project resources to the search user with an assigned relevance score for each resource and/or a summary of the characteristics of the matching/recommended ML project resources (i.e., dataset sizes). The interface display processing step 541 can provide relevant links to training data, models, model authors, etc. With this information, the user can explore each returned project resource in depth.

In addition or in the alternative, the resource presentation processing at step 542 may evaluate the differences between the user model being developed and the returned ML resources. For example, the evaluation processing step 542 may determine a difference metric between the user's content and each returned result, such as noting a difference between the number of dataset images (or image format) in a ML project resource and the number of dataset images (or image format) in the user's model/dataset.

In addition or in the alternative, the resource presentation processing at step 543 may generate recommendations and/or insights for the user based on the identified difference metric values. For example, the difference metrics can be used to prioritize the presentation of matching project resources according to the highest variance between the user's model/dataset and the matching model/datasets. In addition, the difference metrics can be used at the resource presentation processing step 543 to identify and generate recommendations for the user's project to expand the number of entities in the user's model to include entities from resource models with similar domains. In addition, the insight/recommendation processing step 543 may use the difference metrics to identify and generate, for each matching domain, a list of entities found in that domain per model, where the list is used to make a recommendation of entities to add to the user's model. The simplest implementation is to take the superset of this list and present the list to the user. Alternatively, the list of entities can also be prioritized with a presentation order giving prioritized presentation for entities that appeared in the most different models, for entities that appeared most frequently in proportion to other entities in the domain in the models, or for a combination of the above.

Another example recommendation from the insight/recommendation processing step 543 would be to tune the user's dataset to better match the dataset(s) in a ML project resource. For example, if the ML project resources include color images and the user dataset includes black and white images, then the different metrics are used to recommended tuning the user dataset to add color images. Or if the user's model uses long-form text, but the models in the other ML project resources use tweets, then the recommended tuning would be to add tweets to the user's model. Additional examples of recommendations for the user's project may include generating, for every matching ML project model with overlapping type characteristics, a histogram of the model features and plot where the current model sits. For instance, with image classification models, histograms could be generated for the image size in pixels, image brightness, image color depth, and the like. And for text-based models, histograms could be generated for the text length, reading level, language, and the like. In addition, histograms can be generated made for number of training data samples. By displaying the histograms and average data values, the user can better understand the variance between the user's model/datasets and each returned project resource.

Another example recommendation from the insight/recommendation processing step 543 would be to recommend that the user's dataset include processing steps that are done on datasets within the matching model type, such as by identifying or surfacing calls to known functions/APIs. For example, the different metrics can be used to recommend a processing step with the "image_to_grayscale" function (to convert dataset images from color to grayscale) or with the "text_remove_stop_words" function (to recommend a processing step to remove garbage words from the user dataset). In addition or in the alternative, the insight/recommendation processing step 543 may generate a recommendation which presents the user with the top N functions used in the highest number of models related to your domain.

As disclosed herein, the processing at steps 541-543 may be performed at the information handling system 100 or ML project analysis system 310 by employing one or more NLP, extraction, and/or machine learning algorithms to generate insights and recommendations based on the project resources that match the search query.

To provide additional details for an improved understanding of selected embodiments of the present disclosure, an example is now provided to show how a user can deploy the ML project resource locator functionality to build an auto repair image classification model. In this example, the user may start with a dataset of six images organized into folders of "needs repair" or "runs fine." Based on a representative sample of the user's dataset, the ML project resource locator infers that the user is working on an "image classification" model type, and may also identify other model-related search metadata (e.g., model algorithm, performance score, etc.). In addition, the ML project resource locator determines that the user dataset is in the "car" domain and includes a set of entities (e.g., automobile/car/truck, Chevrolet/Ford/Buick, etc.), thought other dataset-related search metadata (e.g., data type, characteristics, etc.) may be identified. Using this information to build a search query, the ML project resource locator begins searching for existing models in a database of ML projects. Based on a comparison of the search metadata to the indexed ML project metadata, the ML project resource locator returns three related models/data sets as search results. The first search result Model 1 is an automobile image classification model (antique vs current cars). The second search result Model 2 is an automobile crash reports analysis (text model). The third search result Model 3 is a Self-Driving car model, images about cars, pedestrians, etc. By way of providing an illustrative example, the search results may be provided with one or more indexed model, dataset, and processing step parameters for each model, as shown below:

| Model | Dataset | Processing Steps |
|---|---|---|
| Model 1:<br>Type: Image<br>Classification | Type: 100 images<br>Characteristics: black and white<br>(average 500 kb)<br>Domain: auto<br>Entities: car/truck, make/model | Convert to pixels |
| Model 2:<br>Type: Text<br>Classification | Type: 50 strings<br>Characteristics: short text<br>(average 50 chars)<br>Domain: auto<br>Entities: warranty, car parts | Lowercase all input |
| Model 3:<br>Type: Image<br>Classification | Type: 500 images<br>Characteristics: full color<br>(average 100 MP) | Reduce image size<br>Convert to gray scale |

-continued

| Model | Dataset | Processing Steps |
|---|---|---|
| | Domain: auto, driving<br>Entities: car, road, sign, billboard, pedestrian | Convert to pixels |

In addition to providing the model/dataset search results (Model 1, Model 2, Model 3), the ML project resource locator may provide one or more insights to the user based on the search results. In this example, the first insight for the user is that the image classification models in automobile domain all use at least 100 images of at least 1GB each, thereby indicating that the user's dataset needs improvement in the form of additional images and more megapixels. In addition, a second insight may be provided to the user to indicate that images from Model 1 or Model 3 may be candidate ground truths. A third insight may be that the user dataset has six automobile models while Model 2 (the crash reports model) has twelve automobile models, and therefore the user dataset needs a greater variety of automobile images. A fourth insight may be that the images from Model 3 include a gray-scaling step, and therefore this gray-scaling step may be useful for the user's model.

By now, it will be appreciated that there is disclosed herein a system, method, apparatus, and computer program product for recommending machine learning (ML) project resources for a user project with an information handling system having a processor and a memory. As disclosed, the system, method, apparatus, and computer program product ingests a plurality of ML projects comprising a plurality of trained models and/or training datasets. By applying natural language processing (NLP) and analytic analysis to the ML projects, each ML project is categorized with indexed project metadata characterizing the domain(s), entities, and relationships between the entities. In addition, the system applies NLP and analytic analysis to a search request for ML project resources to categorize the request with search metadata characterizing the search keywords, intents, and domain. The system also evaluates the search metadata against the indexed project metadata for each ML project to form a relevancy assessment to the search request for each ML project. In selected embodiments, the relevancy assessment is based on entity matching in a common domain for the search request and each ML project, and may be generated using one or more machine learning algorithms. For example, a first machine learning algorithm may be used to generate a relevancy assessment for a first domain, and second, different machine learning algorithm may be used to generate a relevancy assessment for a second domain. After ordering the plurality of trained models based on the relevancy assessment for each ML project, the system displays one or more recommended ML project resources comprising one or more of the plurality of trained models having a relevancy assessment exceeding a relevancy threshold. In addition, the system may compute a difference metric between model/dataset information extracted each recommended ML project resource and model/dataset information extracted from the user project. Based on the difference metric for each recommended ML project resource, the system may generate an insight recommendation to help improve or finish the user project. Finally, the system may present one or more recommended ML project resources on a user interface (UI) by displaying a representation of each trained model exceeding a relevancy threshold, a corresponding relevancy assessment, and keyword mapping to allow a user to adjust prioritization of recommended ML project resources.

In response to receiving a user entry at the interface to adjust prioritization of recommended ML project resources; the system may update the one or more recommended ML project resources presented on the user interface in response to the user entry.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, for recommending machine learning (ML) project resources for a user project, the method comprising:
    ingesting, by the information handling system, a plurality of ML projects comprising a plurality of trained models and/or training datasets;
    applying, by the information handling system, natural language processing (NLP) and analytic analysis to the plurality of ML projects to categorize each ML project with indexed project metadata characterizing said ML project with one or more domain(s), entities, and relationships between the entities;
    applying, by the information handling system, natural language processing (NLP) and analytic analysis to a search request for ML project resources to develop an ML project received to categorize the search request with search metadata characterizing search keywords, intents, and domain;
    evaluating, by the information handling system, the search metadata against the indexed project metadata for each ML project to form a relevancy assessment to the search request for each ML project;
    ordering, by the information handling system, the plurality of trained models based on the relevancy assessment for each ML project; and
    displaying, by the information handling system, one or more recommended ML project resources comprising one or more of the plurality of trained models having a relevancy assessment exceeding a relevancy threshold.

2. The method of claim 1, where the relevancy assessment is based on entity matching in a common domain for the search request and each ML project.

3. The method of claim 2, wherein the relevancy assessment is generated using one or more machine learning algorithms.

4. The method of claim 3, where a first machine learning algorithm for generating a relevancy assessment for a first domain is different from a second machine learning algorithm for generating a relevancy assessment for a second domain.

5. The method of claim 4, further comprising:
presenting, on a user interface (UI), one or more recommended ML project resources with a representation of each trained model exceeding a relevancy threshold, a corresponding relevancy assessment, and keyword mapping to allow a user to adjust prioritization of recommended ML project resources;
receiving, on the user interface, a user entry to adjust prioritization of recommended ML project resources; and
updating the one or more recommended ML project resources presented on the user interface in response to the user entry.

6. The method of claim 1, further comprising computing, by the information handling system, a difference metric between model/dataset information extracted each recommended ML project resource and model/dataset information extracted from the user project.

7. The method of claim 6, further comprising generating, by the information handling system, an insight recommendation based on the difference metric for each recommended ML project resource.

8. An information handling system comprising:
one or more processors;
a memory coupled to at least one of the processors;
a set of instructions stored in the memory and executed by at least one of the processors to recommend machine learning (ML) project resources for a user project, wherein the set of instructions are executable to perform actions of:
ingesting, by the information handling system, a plurality of ML projects comprising a plurality of trained models and/or training datasets;
applying, by the information handling system, natural language processing (NLP) and analytic analysis to the plurality of ML projects to categorize each ML project with indexed project metadata characterizing said ML project with one or more the domain(s), entities, and relationships between the entities;
applying, by the information handling system, natural language processing (NLP) and analytic analysis to a search request for ML project resources to develop an ML project received to categorize the search request with search metadata characterizing the search keywords, intents, and domain;
evaluating, by the information handling system, the search metadata against the indexed project metadata for each ML project to form a relevancy assessment to the search request for each ML project;
ordering, by the information handling system, the plurality of trained models based on the relevancy assessment for each ML project; and
displaying, by the information handling system, one or more recommended ML project resources comprising one or more of the plurality of trained models having a relevancy assessment exceeding a relevancy threshold.

9. The information handling system of claim 8, wherein the set of instructions are executable to form the relevancy assessment based on entity matching in a common domain for the search request and each ML project.

10. The information handling system of claim 8, wherein the set of instructions are executable to form the relevancy assessment by using one or more machine learning algorithms.

11. The information handling system of claim 10, wherein the set of instructions are executable to use a first machine learning algorithm to generate a relevancy assessment for a first domain and to use a second, different machine learning algorithm to generate a relevancy assessment for a second domain.

12. The information handling system of claim 8, wherein the set of instructions are executable to:
present, on a user interface (UI), one or more recommended ML project resources with a representation of each trained model exceeding a relevancy threshold, a corresponding relevancy assessment, and keyword mapping to allow a user to adjust prioritization of recommended ML project resources;
receive, on the user interface, a user entry to adjust prioritization of recommended ML project resources; and
update the one or more recommended ML project resources presented on the user interface in response to the user entry.

13. The information handling system of claim 8, wherein the set of instructions are executable to compute, by the information handling system, a difference metric between model/dataset information extracted each recommended ML project resource and model/dataset information extracted from the user project.

14. The information handling system of claim 13, wherein the set of instructions are executable to generate, by the information handling system, an insight recommendation based on the difference metric for each recommended ML project resource.

15. A computer program product stored in a computer readable storage medium, comprising computer instructions that, when executed by a processor at an information handling system, causes the information handling system to recommend machine learning (ML) project resources for a user project by:
ingesting, by the information handling system, a plurality of ML projects comprising a plurality of trained models and/or training datasets;
applying, by the information handling system, natural language processing (NLP) and analytic analysis to the plurality of ML projects to categorize each ML project with indexed project metadata characterizing said ML project with one or more the domain(s), entities, and relationships between the entities;
applying, by the information handling system, natural language processing (NLP) and analytic analysis to a search request for ML project resources to develop an ML project received to categorize the search request with search metadata characterizing the search keywords, intents, and domain;
evaluating, by the information handling system, the search metadata against the indexed project metadata for each ML project to form a relevancy assessment to the search request for each ML project;
ordering, by the information handling system, the plurality of trained models based on the relevancy assessment for each ML project; and
displaying, by the information handling system, one or more recommended ML project resources comprising one or more of the plurality of trained models having a relevancy assessment exceeding a relevancy threshold.

16. The computer program product of claim 15, further comprising computer instructions that, when executed, cause the information handling system to use one or more machine learning algorithms to generate the relevancy assessment based on entity matching in a common domain for the search request and each ML project.

17. The computer program product of claim 16, where a first machine learning algorithm for generating a relevancy assessment for a first domain is different from a second machine learning algorithm for generating a relevancy assessment for a second domain.

18. The computer program product of claim 16, further comprising computer instructions that, when executed, causes the information handling system to:
  present, on a user interface (UI), one or more recommended ML project resources with a representation of each trained model exceeding a relevancy threshold, a corresponding relevancy assessment, and keyword mapping to allow a user to adjust prioritization of recommended ML project resources;
  receive, on the user interface, a user entry to adjust prioritization of recommended ML project resources; and
  update the one or more recommended ML project resources presented on the user interface in response to the user entry.

19. The computer program product of claim 15, further comprising computer instructions that, when executed, cause the information handling system to compute a difference metric between model/dataset information extracted each recommended ML project resource and model/dataset information extracted from the user project.

20. The computer program product of claim 19, further comprising computer instructions that, when executed, cause the information handling system to generate an insight recommendation based on the difference metric for each recommended ML project resource.

* * * * *